United States Patent
Zhu

(10) Patent No.: US 9,408,034 B2
(45) Date of Patent: Aug. 2, 2016

(54) EXTENDED AREA EVENT FOR NETWORK BASED PROXIMITY DISCOVERY

(71) Applicant: TeleCommunication Systems, Inc., Annapolis, MD (US)

(72) Inventor: Yinjun Zhu, Sammamish, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/472,857

(22) Filed: Aug. 29, 2014

(65) Prior Publication Data
US 2015/0072713 A1    Mar. 12, 2015

Related U.S. Application Data

(60) Provisional application No. 61/875,291, filed on Sep. 9, 2013.

(51) Int. Cl.
*H04W 24/00* (2009.01)
*H04W 4/02* (2009.01)
*H04W 8/00* (2009.01)

(52) U.S. Cl.
CPC .............. *H04W 4/023* (2013.01); *H04W 8/005* (2013.01)

(58) Field of Classification Search
CPC ............................. H04W 4/023; H04W 8/005
USPC ........................................................ 455/456.3
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor et al. |
| 4,494,119 A | 1/1985 | Wimbush |

(Continued)

FOREIGN PATENT DOCUMENTS

| | | |
|---|---|---|
| WO | WO99/21380 | 10/1998 |
| WO | WO01/45342 | 6/2001 |

(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

(Continued)

*Primary Examiner* — Nader Bolourchi
(74) *Attorney, Agent, or Firm* — Tarolli, Sundheim, Covell & Tummino LLP

(57) ABSTRACT

A network-centric device discovery solution that leverages area event location services. A proximity server (PS) performing device discovery for a discoverer mobile initiates an area event, via a location server, for each device subscribed to the same proximity service group as the discoverer mobile and camped on the same zone as the discoverer mobile. The area event notifies the PS each time such device moves into an area of an E-CGI and/or WiFi access point where the discoverer mobile attaches. If the PS receives an area event notification for the device camped on the same zone as the discoverer mobile, the PS requests location information for the device and uses returned location information to determine if the device is within a predefined proximity of the discoverer mobile. If the device is within a predefined proximity of the discoverer mobile, the PS sends a proximity alert message to the discoverer mobile.

16 Claims, 16 Drawing Sheets

(56) References Cited

U.S. PATENT DOCUMENTS

| | | |
|---|---|---|
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Sheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |

(56) References Cited

U.S. PATENT DOCUMENTS

| | | |
|---|---|---|
| 5,982,301 A | 11/1999 | Ohta |
| 5,983,099 A | 11/1999 | Yao |
| 5,983,109 A | 11/1999 | Montoya |
| 5,987,323 A | 11/1999 | Houtari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayahi |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabash |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alanara |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,742 B1 | 6/2001 | Friederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotola |
| 6,324,542 B1 | 11/2001 | Wright, Jr. et al. |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Peschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |

(56) References Cited

U.S. PATENT DOCUMENTS

| | | |
|---|---|---|
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Rantalainen et al. |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockeart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 * | 11/2004 | Kinnunen ............... H04W 4/02 342/457 |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Baucke et al. |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,535 B2 | 9/2005 | Iwata |
| 6,944,540 B2 | 9/2005 | King |
| 6,947,772 B2 | 9/2005 | Minear |

(56) References Cited

U.S. PATENT DOCUMENTS

| | | |
|---|---|---|
| 6,950,058 B1 | 9/2005 | Davis |
| 6,957,068 B2 | 10/2005 | Hutchison |
| 6,957,073 B2 | 10/2005 | Bye |
| 6,961,562 B1 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | Mccalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenmaa |
| 7,221,959 B2 | 5/2007 | Lindqvist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 8,525,681 B2 * | 9/2013 | Gehrke ............ G08B 21/0269 340/539.13 |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthuis |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |

(56) References Cited

U.S. PATENT DOCUMENTS

| | | |
|---|---|---|
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineberg |
| 2003/0201931 A1 | 10/2003 | Durst |
| 2003/0204640 A1 | 10/2003 | Sahinoja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Cambell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0027445 A1 | 2/2005 | McDonough |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0046709 A1* | 3/2006 | Krumm ............... H04N 21/4126 455/422.1 |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |

(56) References Cited

U.S. PATENT DOCUMENTS

| | | |
|---|---|---|
| 2007/0149213 A1 | 6/2007 | Lamba |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Conor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0224931 A1 | 9/2009 | Dietz |
| 2009/0298488 A1 | 12/2009 | Snapp |
| 2009/0328163 A1 | 12/2009 | Preece |
| 2010/0003976 A1 | 1/2010 | Zhu |
| 2010/0004993 A1 | 1/2010 | Troy |
| 2010/0042592 A1 | 2/2010 | Stolz |
| 2010/0067444 A1 | 3/2010 | Faccin |
| 2010/0167760 A1 | 7/2010 | Kim |
| 2010/0188992 A1 | 7/2010 | Raleigh |
| 2010/0268848 A1 | 10/2010 | Maurya |
| 2011/0113060 A1 | 5/2011 | Martini |
| 2011/0165861 A1 | 7/2011 | Wilson |
| 2014/0056220 A1* | 2/2014 | Poitau ............ H04W 40/246 370/328 |

FOREIGN PATENT DOCUMENTS

| | | |
|---|---|---|
| WO | WO02/11407 | 7/2001 |
| WO | WO2004/025941 | 3/2004 |
| WO | WO2007/027166 | 6/2005 |
| WO | WO2005051033 | 6/2005 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1 NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letterin Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, p. 142-p. 143. (no English text).

Schulzrinne et al., Emergency Services for Internet Telephony Systems draft-schulzrinne-sipping-emergency-arch, IETF Standard Working Draft, Feb. 4, 2004, 1-22.

* cited by examiner

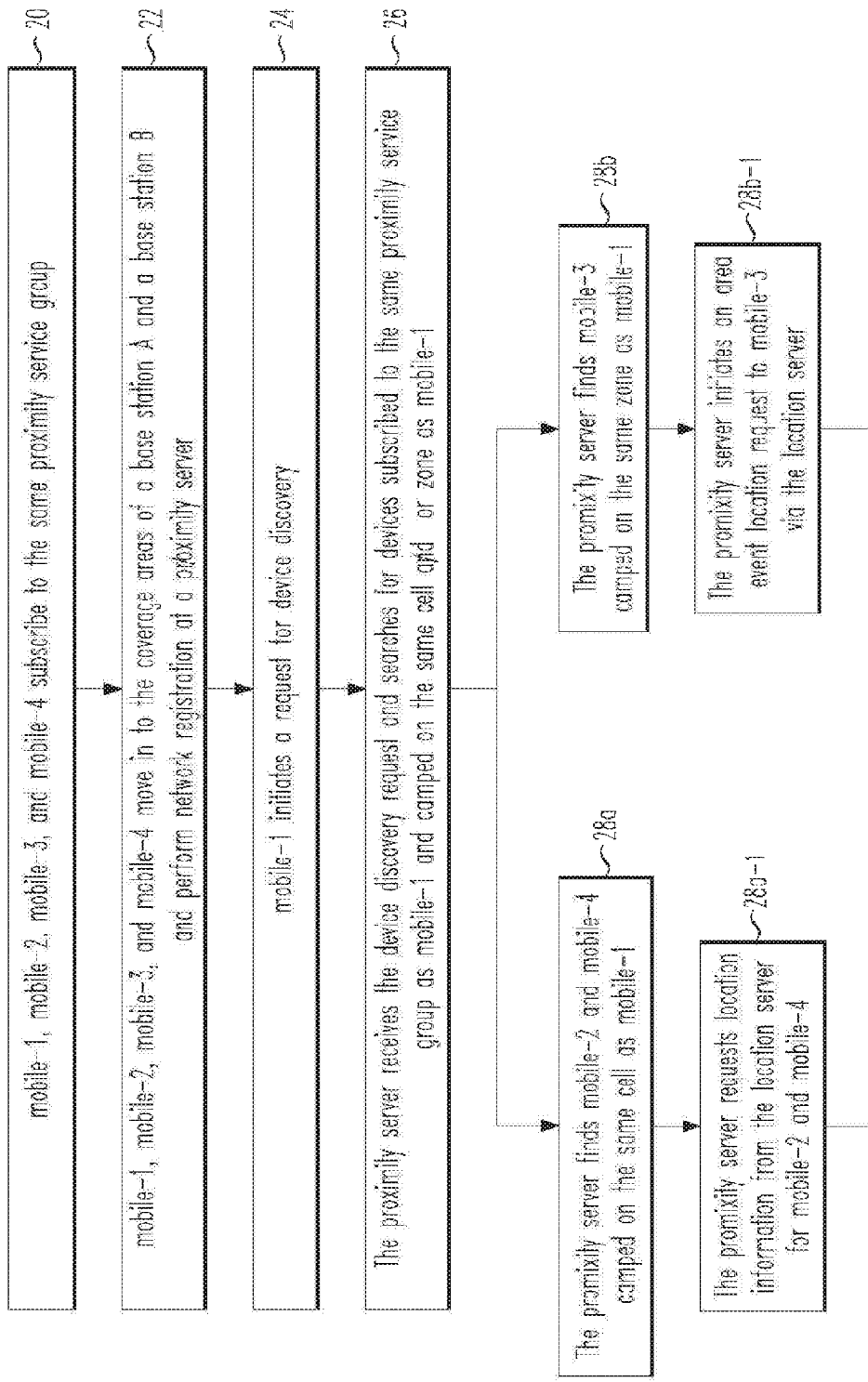

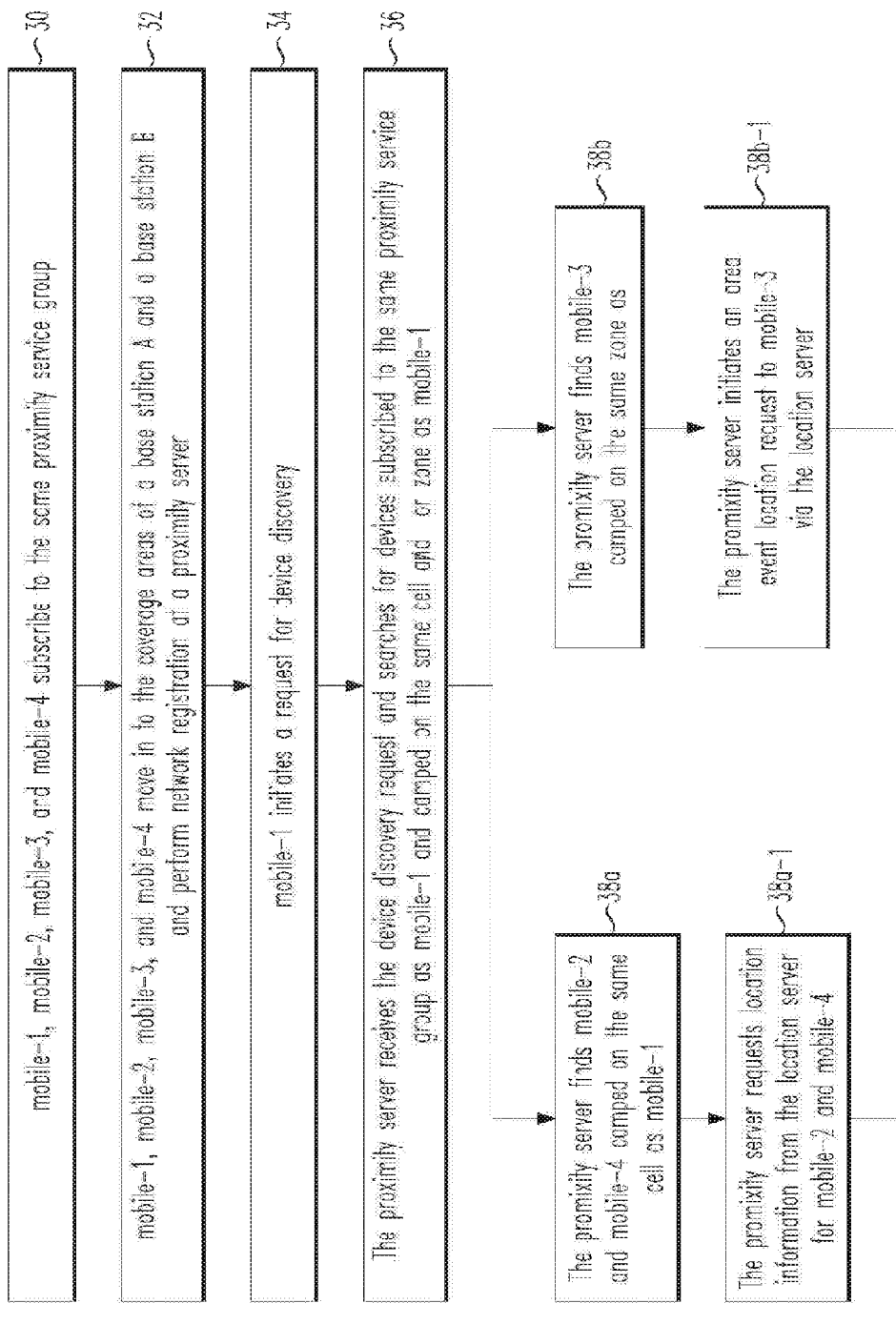

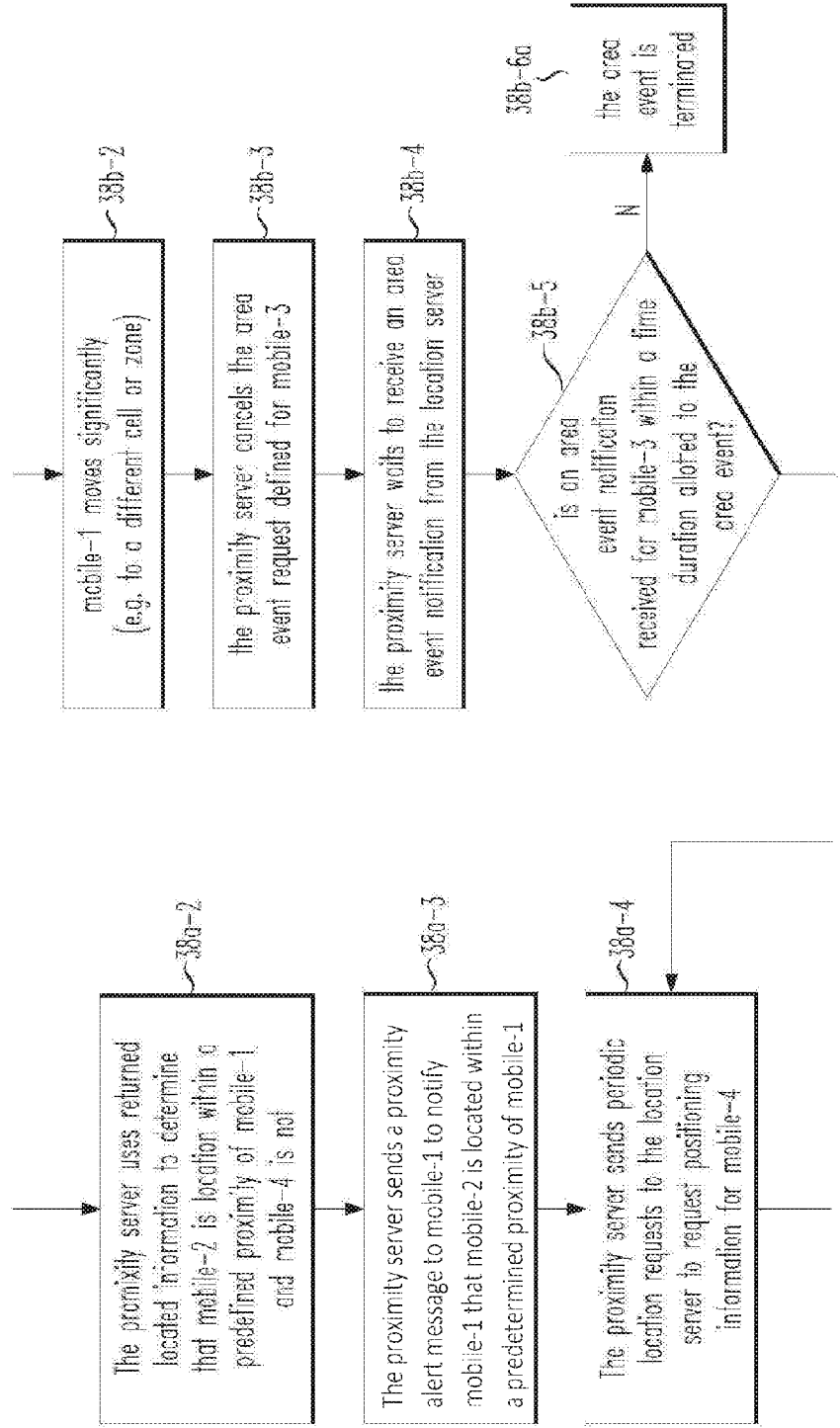

EXTENDED AREA EVENT FOR NETWORK BASED PROXIMITY DISCOVERY

The present invention claims priority from U.S. Provisional No. 61/875,291, filed Sep. 9, 2013, entitled "Extended Area Event for Network Based Proximity Discovery", the entirety of which is expressly incorporated herein by reference.

BACKGROUND OF THE INVENTION

1. Field of the Invention

This invention relates generally to wireless Internet Service Providers, Public Safety Service Providers and information content delivery services/providers for wireless networks and/or Public Safety Service networks. More particularly, it relates to location services for the wireless industry.

2. Background of Related Art

A proximity based service is a conventional service that utilizes location technology to allow subscriber devices to discover other subscriber devices located within a predefined proximity range. Subscriber devices that discover one another can then engage in direct peer-to-peer (p2p) communications, with or without use of a radio network infrastructure, e.g., a base station. WiFi may also be used as a medium for proximity based services.

A conventional proximity based service comprises two components: device discovery and direct communications.

The device discovery component of a proximity based service enables subscriber devices to discover other subscriber devices that are located nearby (i.e. located within a predefined proximity zone), when subscriber devices are being serviced by a network that supports proximity based services.

Moreover, the direct communications component of a proximity based service permits any two or more proximity based services enabled devices, located within a predefined proximity of one another, to engage in direct peer-to-peer (p2p) communications.

FIGS. 8A-8B depict an illustrative example of direct peer-to-peer (p2p) communications for proximity based services.

In particular, as portrayed in FIG. 7, when two or more proximity based services enabled devices 800, 810, 820 discover one another within a predefined proximity zone 830, the devices 800, 810, 820 may set up a direct peer-to-peer (p2p) communications session 840, with or without use of a radio network infrastructure (e.g. a base station) 850.

FIG. 7 depicts a conventional network-centric device discovery method.

In particular, as portrayed in step 71 of FIG. 8A, a mobile-1, a mobile-2, a mobile-3, and a mobile-4 all subscribe to the same proximity service group.

As shown in step 73, the mobile-1, mobile-2, mobile-3, and mobile-4 subsequently move into the coverage areas of a base station A and a base station B, and all are registered by mobile identifier and cell-ID (e.g. CGI or ECGI) at a proximity server.

In step 75, mobile-1 sends a device discovery request to the proximity server to request location information for mobile devices (e.g. mobile-2, mobile-3, and mobile-4) subscribed to the same proximity service group as mobile-1.

In step 77, the proximity server receives the device discovery request and initiates a location request for mobile-2, mobile-3, and mobile-4, each of which are subscribed to the same proximity service group as mobile-1.

In step 79, in the given example, the proximity server determines that mobile-2 and mobile 4 are located within a predefined proximity of mobile-1.

In step 81, upon such discovery, the proximity server sends a proximity alert message to mobile-1 to notify mobile-1 that mobile-2 and mobile-4 are both located within a predefined proximity of mobile-1.

As depicted in step 83 of FIG. 8b, the proximity server periodically sends location requests to the location server to request positioning information for mobile-3, within an expiration time duration allotted to the device discovery request as shown in step 89.

As shown in steps 85 and 87, if during the time duration allotted to the device discovery request, mobile-3 is within a predefined proximity of mobile-1, the proximity server sends a proximity alert message to mobile-1 to indicate that mobile-3 is now located within a predefined proximity of mobile-1.

If the time duration allotted to the device discovery request expires, device discovery is terminated, as portrayed in step 91 of FIG. 8b.

In the network-centric device discovery solution portrayed in FIGS. 8A-8B, the proximity server and the location server must periodically exchange positioning information for mobile-3 throughout the time duration allotted to the device discovery request, as it is not possible to predict when mobile-3 will move within closer geographic proximity of mobile-1. Unfortunately, it is difficult to determine an optimal time interval at which the proximity server and the location server should exchange positioning information. For instance, depending on a particular speed that mobile-3 is traveling at, if a proximity location request interval is set too high, the proximity server may miss when mobile-3 (i.e. the discoveree mobile) is located within a predefined proximity of mobile-1 (e.g. mobile-3 may move in and out of a predefined proximity of mobile-1 before a location request is exchanged between the location server and the proximity server). Alternatively, if a proximity location request interval is set too low, significant network and radio resources (and also mobile battery) are consumed for positioning.

Conventional proximity based services yield a number of potential applications, e.g., friend finding, gaming, etc. A common example of a proximity based service is geofencing (AKA area event location service or area watching).

A geofencing service/area event location service is a conventional service that generates an event based notification each time a target mobile device enters or exits a predefined geographic area. A geofencing service/area event location service thus utilizes both proximity based services and predefined location information to alert requesting subscriber devices to the whereabouts of a target mobile device. For instance, a geofencing service may send an event based notification to a requesting subscriber device whenever a target mobile device enters or exits a predefined geographic area.

Existing device discovery solutions for proximity based services include: a mobile-centric device discovery solution and a network-centric device discovery solution. In a mobile-centric device discovery solution, a proximity based services enabled device uses radio technology to identify other mobile devices located within a predefined proximity zone. For instance, a proximity based services enabled device may evaluate its proximity to another mobile device by assessing radio signal strength received from that mobile device.

A network-centric device discovery solution for proximity based services is rooted in existing location based services for mobile networks.

SUMMARY OF THE INVENTION

A system and method for enabling efficient device discovery for proximity based services comprises a network-centric device discovery solution that leverages an area event location service.

The inventive network-centric device discovery solution with area event location service utilizes a proximity server and a location server. The location server retrieves location information for proximity based services enabled devices, responds to area event location requests, and manages area event location services, etc., whereas the proximity server manages subscriber data for proximity based services and receives and responds to device discovery requests initiated by discoverer mobiles (i.e. mobile devices that have initiated a device discovery request).

In accordance with the principles of the present invention, when a proximity server receives a request for device discovery from a discoverer mobile (i.e. a mobile device that has initiated a device discovery request), the proximity server searches for mobile devices that are both subscribed to the same proximity service group as the discoverer mobile and camped on the same cell (e.g. cell global identity (CGI) and/or zone (e.g. location area identity (LAI), routing area identity (RAI), tracking area identity (TAI)) as the discoverer mobile.

In accordance with the principles of the present invention, if the proximity server finds a mobile device that is both subscribed to the same proximity service group as a discoverer mobile and located within a same cell as a discoverer mobile, the proximity server sends a location request to the location server to request location information for the potential discoveree device (i.e. a device that is potentially located within a predefined proximity of a discoverer mobile).

If the proximity server determines that the potential discoveree device is located within a predefined proximity of the discoverer mobile, the proximity server sends a proximity alert message to the discoverer mobile to notify the discoverer mobile that a discoveree device (i.e. a device located within a predefined proximity of a discoverer device) is located within a predefined proximity of the discoverer mobile and thus further communication with this device is now possible.

Alternatively, if the proximity server finds a mobile device that is both subscribed to the same proximity service group as the discoverer mobile and located within the same zone (e.g. location area identity (LAI), routing area identity (RAI), tracking area identity (TAI)) as the discoverer mobile (but not located within the same cell as the discoverer mobile), the proximity server initiates an area event, via the location server, for the potential discoveree device. The proximity server preferably defines the area event so that the proximity server is alerted each time a potential discoveree device moves into an area of an E-CGI and/or a WiFI access point where the discoverer mobile attaches.

In accordance with the principles of the present invention, if the proximity server receives an area event notification for the potential discoveree device, indicating that the potential discoveree device has moved into an area of an Evolved Universal Terrestrial Access Network (E-UTRAN) cell global identity (E-CGI) and/or a WiFi access point where the discoverer mobile attaches, the proximity server sends a location request to the location server to request location information for the potential discoveree device.

If location information returned from the location server for the potential discoveree device indicates that the potential discoveree device has moved into a predefined proximity of the discoverer mobile, the proximity server sends a proximity alert message to the discoverer mobile to notify the discoverer mobile that a mobile device is located within a predefined proximity of the discoverer mobile and thus further communication with this device is now possible.

Alternatively, if it is determined that the potential discoveree device is not located within a predefined proximity of the discoverer mobile, the proximity server waits for an area event notification from the location server.

The inventive device discovery solution is more efficient and more accurate than existing network-centric device discovery solutions.

BRIEF DESCRIPTION OF THE DRAWINGS

Features and advantages of the present invention will become apparent to those skilled in the art from the following description with reference to the drawings, in which:

FIGS. 2A-2C depict an exemplary network-centric device discovery solution with area event location service, in accordance with the principles of the present invention.

FIGS. 3A-3C depict an exemplary network-centric device discovery solution with area event location service where the discoverer mobile moves significantly during the device discovery procedure, in accordance with the principles of the present invention.

DETAILED DESCRIPTION OF ILLUSTRATIVE EMBODIMENTS

The present invention extends conventional area event location services, as described in U.S. Pat. Nos. 7,764,961 and 8,249,589, (both explicitly incorporated herein by reference) and implements methods of network-centric device discovery to provide a more efficient device discovery procedure for proximity based services.

Device discovery for proximity based services is conventionally achieved via several different methods. For instance, a proximity based services enabled device operating on a wireless network that supports proximity based services may implement radio frequency (RF) device discovery (i.e. neighbor discovery) by periodically generating a peer discovery signal, in synchronization with the wireless network.

Alternatively, a proximity server and an associated location server may provide device discovery by continuously requesting location information for potential discoveree devices (i.e. devices potentially located within a predefined proximity of a discoverer mobile) that are located nearby a discoverer mobile (i.e. a device that has initiated a device discovery request).

The present invention leverages an existing area event location service to provide a more efficient device discovery procedure for proximity based services.

An area event location service is a conventional service that generates an event based notification each time a predefined area event occurs, e.g., each time a target mobile device enters or exits a predefined geographic area.

The inventive device discovery procedure is based on a conventional network-centric device discovery solution.

Figure 1:
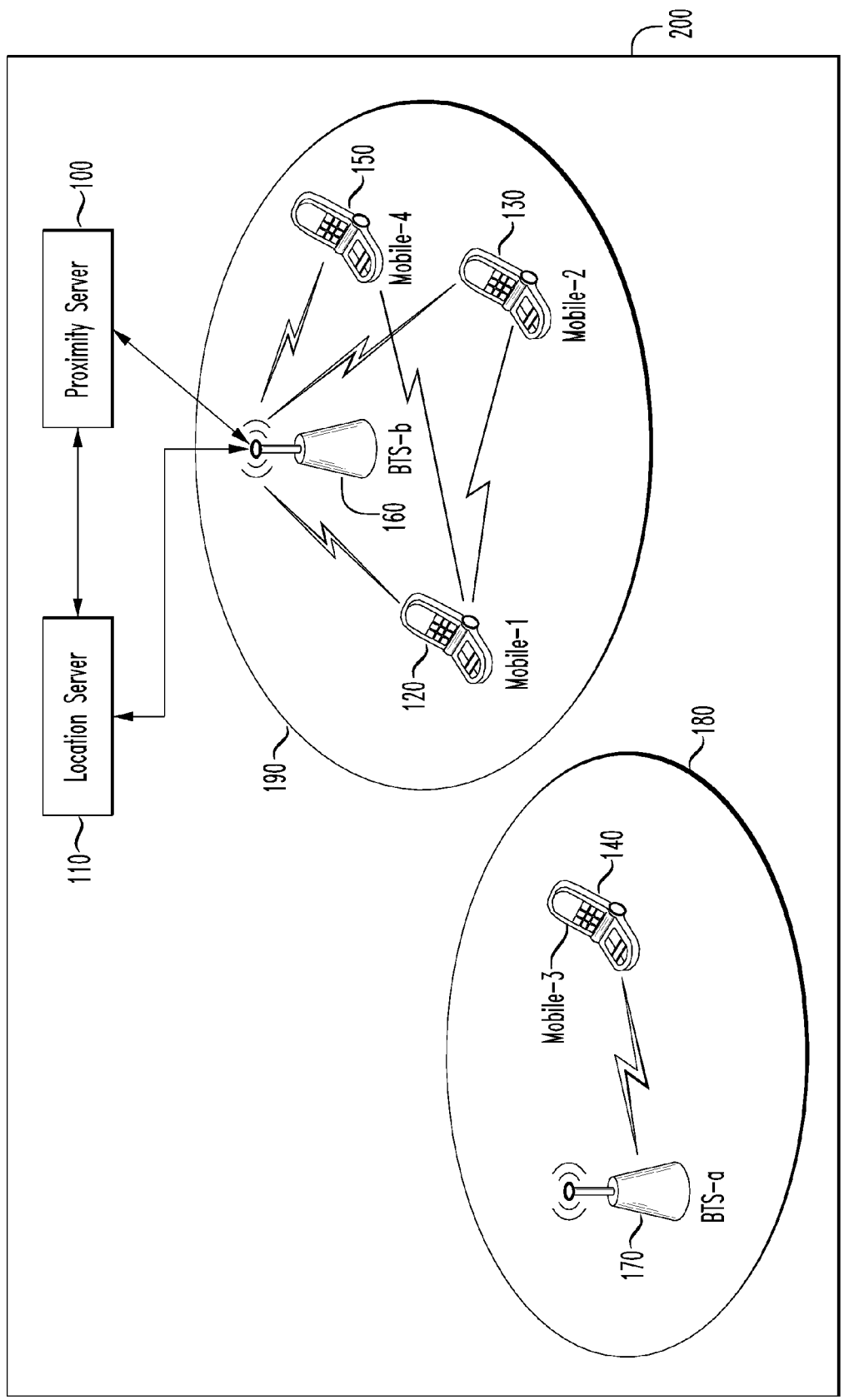
FIG. 1 depicts an exemplary network context diagram showing a proximity based service that provides network-centric device discovery for proximity based services, in accordance with the principles of the present invention.

FIG. 1 depicts an exemplary network context diagram showing a proximity based service that provides network-centric device discovery for proximity based services, in accordance with the principles of the present invention.

As depicted in FIG. 1, a network-centric device discovery solution preferably utilizes both a proximity server 100 and a location server 110. In accordance with the principles of the present invention, a proximity server 100 in a network-centric device discovery solution manages subscriber data for proximity based services and receives and responds to device discovery requests. For example, the proximity server 100 may maintain: subscriptions to proximity based services, subscriber device relationships (e.g. subscriber devices' current proximity to one another, subscriber devices currently engaged in peer-to-peer (p2p) communications, etc.), associated service identifiers (e.g. unique proximity based service identifiers), etc.

The location server 110 in a network-centric device discovery solution preferably retrieves location information for proximity based services enabled devices, responds to area event location requests, and manages area event location services, etc.

Figure 7:
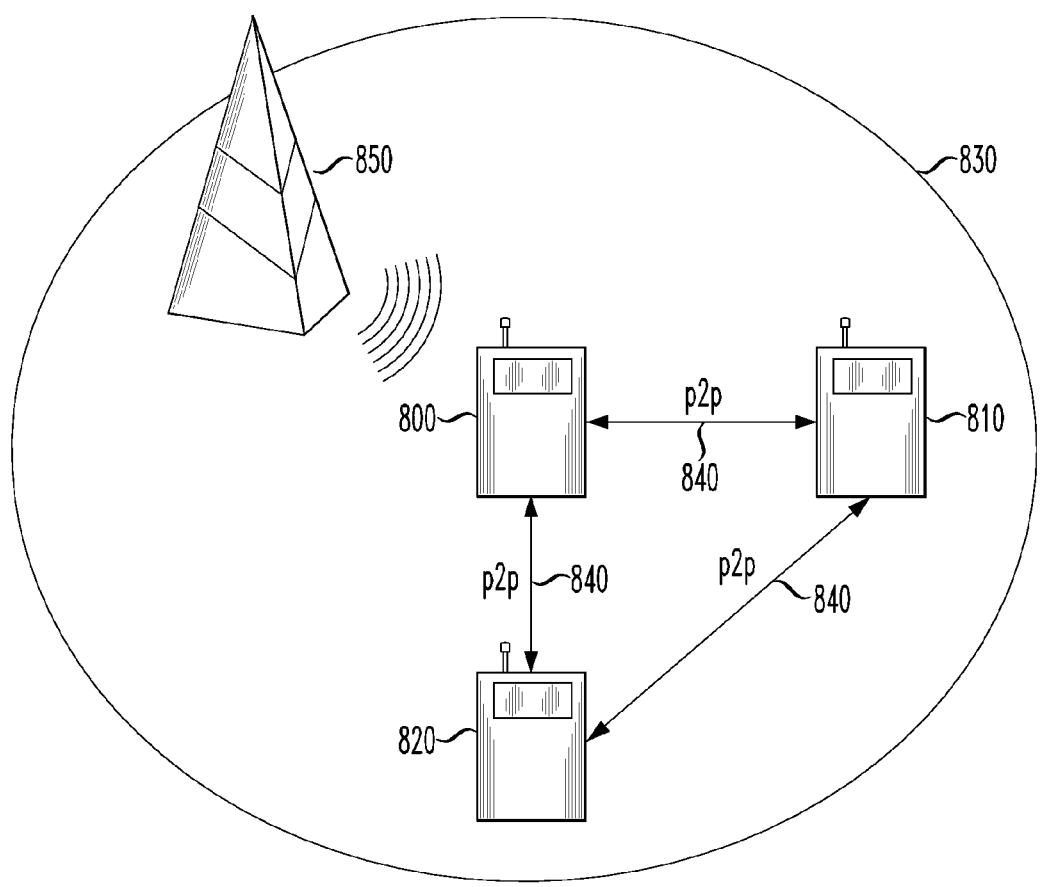
FIG. 7 depicts a conventional illustrative example of direct peer-to-peer (p2p) communications for proximity based services.
Figure 8A:
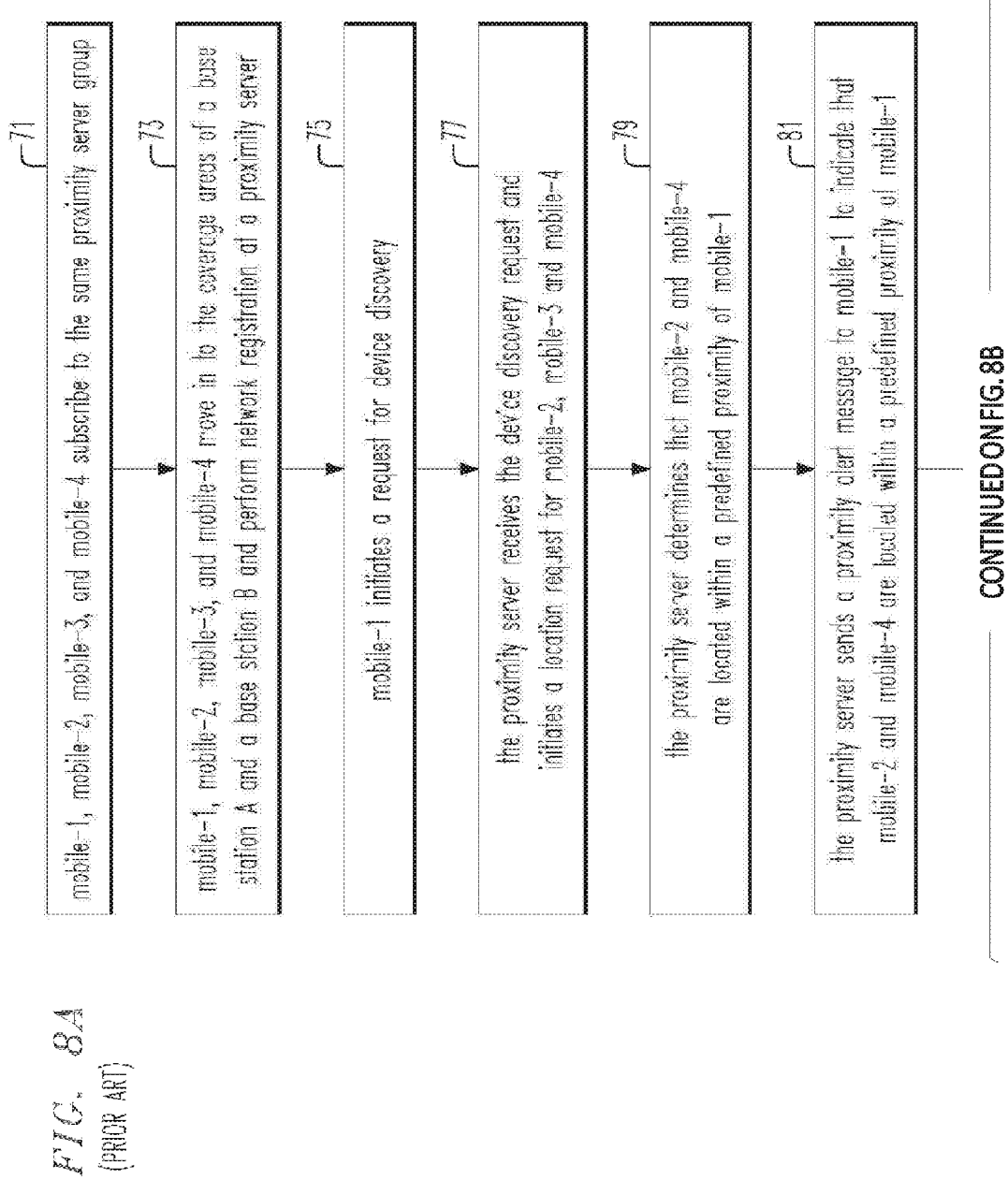
FIGS. 8A-8B depict a conventional network-centric device discovery method.
Figure 8B:
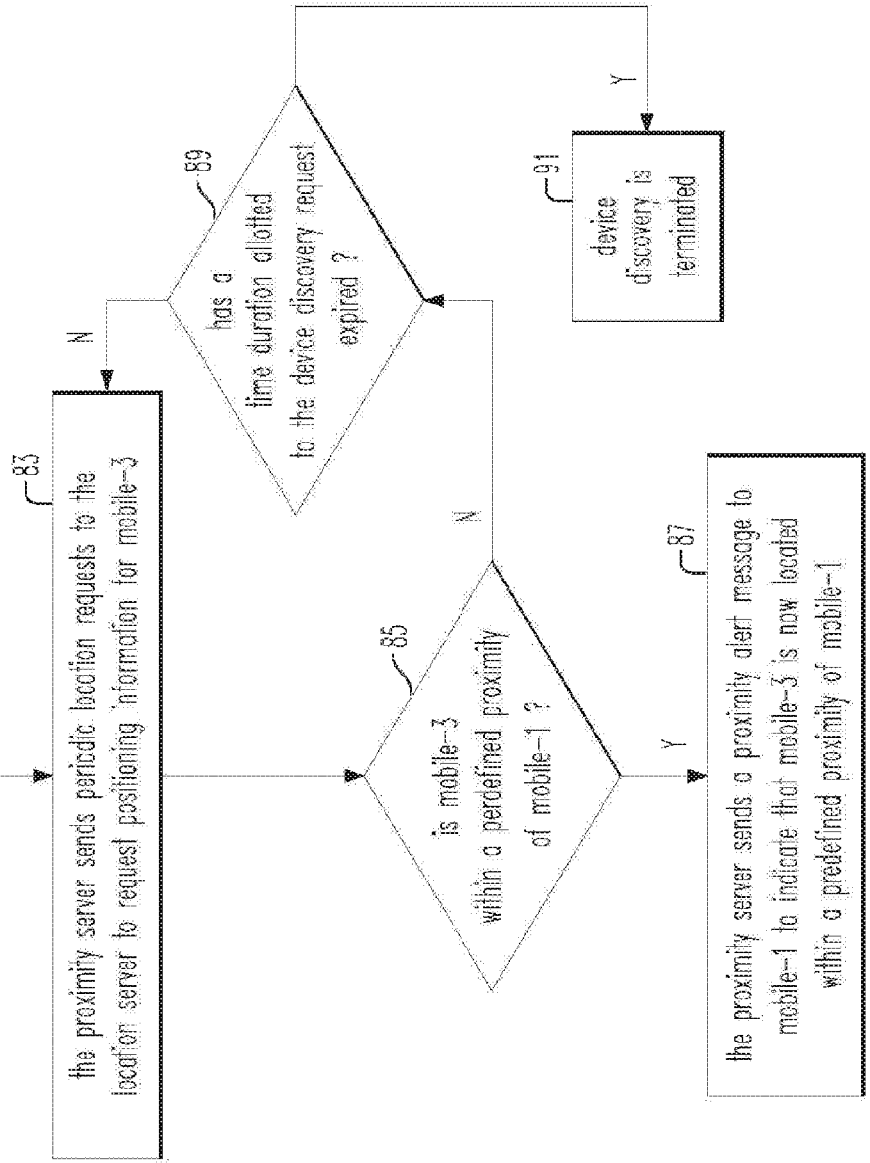

As described above, the conventional network-centric device discovery method shown in FIG. 7 does not leverage area event location services as provided herein by the present invention. The present invention provides a system and method for efficiently processing device discovery requests using area event location services (also known as geofencing).

Figure 2B:
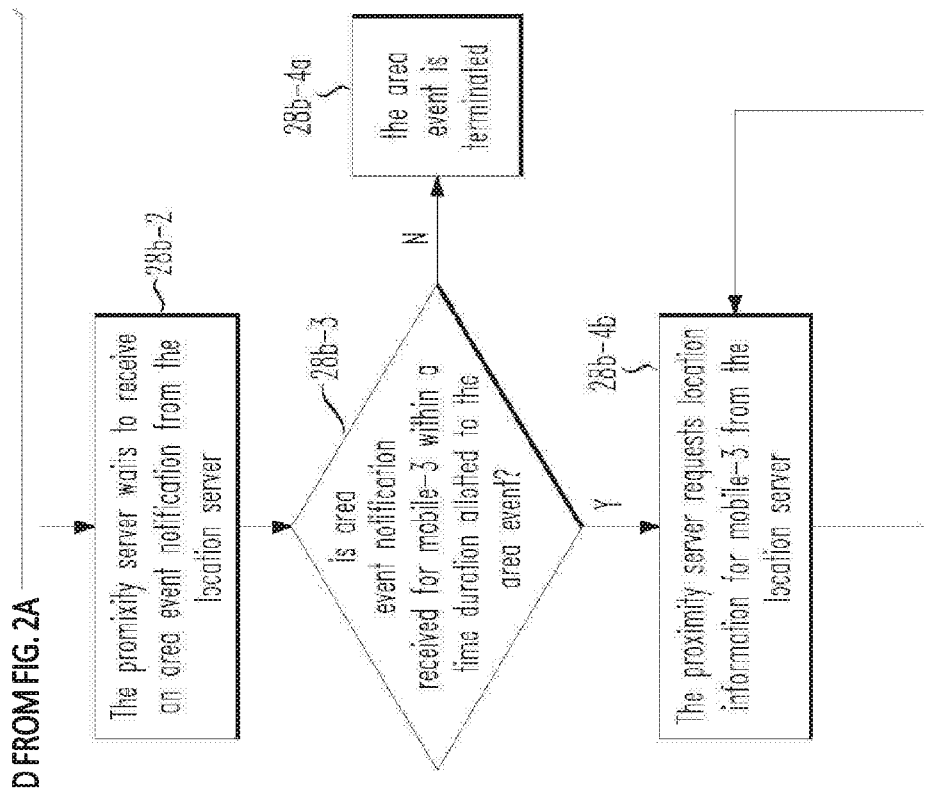
Figure 2B:
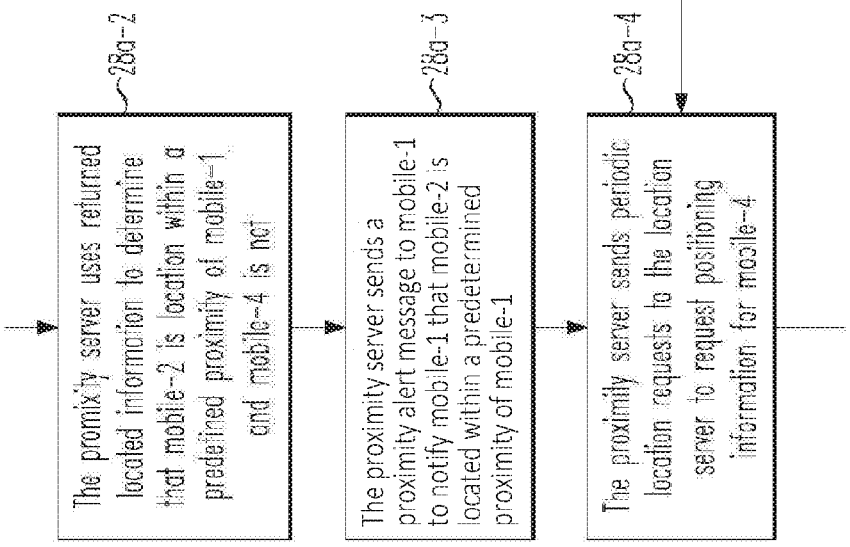
Figure 2C:
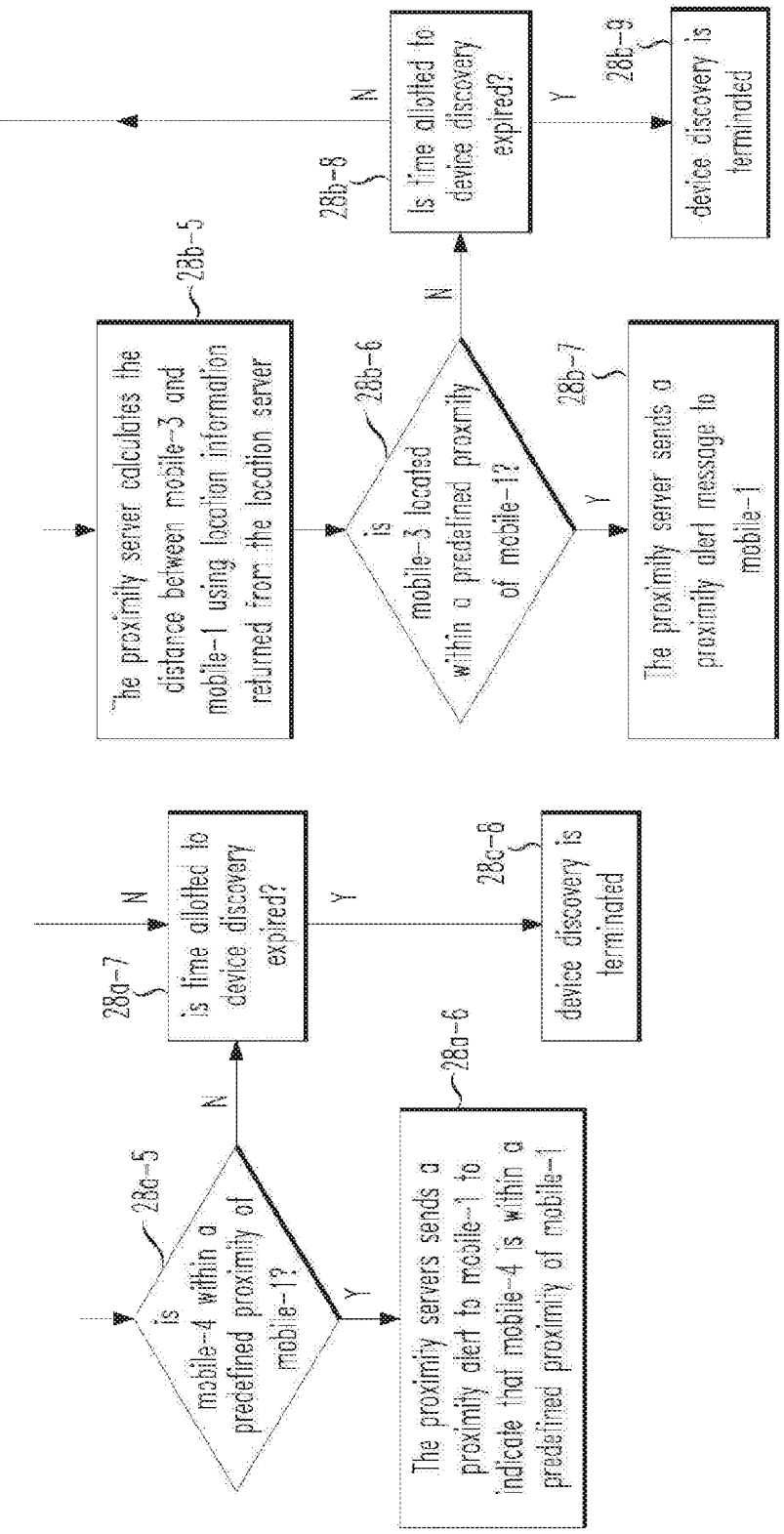

FIGS. 2A-2C depict an exemplary network-centric device discovery solution with area event location service, in accordance with the principles of the present invention.

In particular, as portrayed in step 20 of FIG. 2A, a mobile-1 120, a mobile-2 130, a mobile-3 140, and a mobile-4 150 all subscribe to the same proximity service group.

As shown in step 22, the mobile-1 120, mobile-2 130, mobile-3 140, and mobile-4 150 then move in to the coverage areas of a base station B (BTS-B) 160 and a base station A (BTS-A) 170, respectively, and all are registered by mobile identifier, cell-ID (e.g. cell global identifier (CGI) or E-UTRAN cell global identifier (ECGI)), and other network identifiers (e.g. location area identifier (LAI), routing area identifier (RAI), tracking area identity (TAI), public land mobile network identifier (PLMN-ID)) at a proximity server 100. Mobile-3 140 is serviced by base station A (BTS-A) 170, while mobile-1 120, mobile-2 130, and mobile-4 150 are all serviced by base station B (BTS-B) 160. Mobile-3 140 is not located within the same cell 190 as mobile-1 120, mobile-2 130, and mobile-4 150, but is located within the same zone (e.g. in the same TAI, RAI, LAI) 200 as mobile-1 120, mobile-2 130, and mobile-4 150. Mobile-3 140 is not located within close geographic proximity of mobile-1 120, mobile-2 130, and mobile-4 150.

As shown in step 24, mobile-1 120 sends a device discovery request to the proximity server 100 to request location information for mobile devices (e.g. mobile-2 130, mobile-3 140, and mobile-4 150) subscribed to the same proximity service group as mobile-1 120. Mobile-1 120 preferably forwards the following information with the device discovery request: a proximity services (ProSe) service type, a mobile identifier, a proximity services (ProSe) group ID, current location information, serving network information (e.g. public land mobile network identifier (PLMN-ID), a location area identifier (LAI)/routing area identifier (RAI)/tracking area identity (TAI), cell global identifier (CGI)/E-UTRAN cell global identifier (ECGI), wifi access point address, etc.), etc.

As depicted in step 26, the proximity server 100 receives the device discovery request initiated by mobile-1 120 and searches for proximity based services enabled devices that are both: subscribed to the same proximity service group as mobile-1 120 and camped on the same cell (e.g. ECGI) 190 and/or zone (e.g. location area identity (LAI), routing area identity (RAI), tracking area identity (TAI)) as mobile-1 120.

As shown in steps 28a and 28a-1 of FIG. 2A, if the proximity server 100 finds devices that are both subscribed to the same proximity service group as mobile-1 120 and camped on the same cell 190 as mobile-1 120, the proximity server 100 requests location information for such devices from the location server 110. For instance, in the example portrayed in FIG. 1, the proximity server finds both mobile-2 130 and mobile-4 150 camped on the same cell 190 as mobile-1 120 and thus requests location information for mobile-2 130 and mobile-4 150 from the location server 110.

As shown in step 28a-2 of FIG. 2A, once the proximity server 100 receives location information for mobile-2 130 and mobile-4 150 from the location server 110, the proximity server 100 calculates the distance between mobile-1 120 and mobile-2 130 and mobile-1 120 and mobile-4 150, and finds that mobile-2 130 is currently located with a predefined proximity of mobile-1 120, while mobile-4 150 is not. Using this information, the proximity server 100 transmits a proximity alert message to mobile-1 120 to indicate that mobile-2 130 is currently located within a predefined proximity of mobile-1 120, and thus further communication with mobile-2 is now possible, as portrayed in step 28a-3.

As portrayed in step 28a-4, the proximity server 100 periodically requests location information for mobile-4 150 throughout the duration of time allotted to the device discovery request. If during this time, the proximity server 100 finds that mobile-4 150 has moved within a predefined proximity of mobile-1 120 (step 28a-5), the proximity server 100 sends a proximity alert message to mobile-1 120 to notify mobile-1 120 of this occurrence, as shown in step 28a-6.

Alternatively, as portrayed in step 28a-7, if location information indicates that mobile-4 150 is not located within a predefined proximity of mobile-1 120, the proximity server 100 continues to send periodic location requests to the location server 110 for mobile-4 150, as long as a time duration allotted to the device discovery request is not expired.

If the time duration allotted to the device discovery request has expired, device discovery is terminated, as shown in step 28a-8.

Moreover, if the proximity server 100 finds a device that is both subscribed to the same proximity service group as the discoverer mobile and camped on the same zone as the discoverer mobile, but not camped in the same cell as the discoverer mobile, the proximity server 100 defines an area event for the potential discoveree device.

For instance, in the example depicted in FIG. 1, the proximity server 100 finds that mobile-3 140 is both subscribed to the same proximity service group as mobile-1 120 and located within the same zone 200 as mobile-1 120 (but not located within the same cell 190 as mobile-1 120), as portrayed in step 28b of FIG. 2A.

As shown in step 28b-1, the proximity server 100 then initiates an area event location request, via the location server 110, to mobile-3 140. The area event location request is preferably defined so that an area event notification is sent to the proximity server 100 each instance mobile-3 140 (i.e. the potential discoveree mobile) enters the area of an E-CGI and/or a WiFi access point where mobile-1 (i.e. the discoverer mobile) 120 attaches. The proximity server 100 preferably allots the same time duration to the area event location request as has been allotted to the device discovery request.

As depicted in step 28b-2, the proximity server 100 then waits for an area event notification from the location server 110.

As shown in steps 28b-3 and 28b-4a, if the proximity server 100 does not receive an area event notification for mobile-3 140 within a time duration allotted to the area event location request, the area event location request is terminated.

Alternatively, as shown in step 28b-4b, if the proximity server 100 does receive an area event notification for mobile-3 140, indicating that mobile-3 140 has entered the area of an E-CGI and/or a WiFi access point where mobile-1 120 (i.e. the discoverer mobile) attaches, the proximity server 100 sends a location request to the location server 110 to request location information for mobile-3 140.

In step 28b-5, the location server 110 returns location information for mobile-3 140 to the proximity server 100 and the proximity server 100 uses the location information to calculate the distance between mobile-1 120 and mobile-3 140. The proximity server 100 then uses the calculated distance to determine whether or not mobile-3 140 is located within a predefined proximity of mobile-1 120.

As shown in steps 28b-6 and 28b-7, if mobile-3 140 is located within a predefined proximity of mobile-1 120, the proximity server 100 sends a proximity alert message to mobile-1 120 to notify mobile-1 120 that mobile-3 140 is now located within a predefined proximity of mobile-1 120, and thus further communication with mobile-3 140 is now possible.

Alternatively, as depicted in step 28b-8, if mobile-3 140 is not located within a predefined proximity of mobile-1 120, the proximity server 100 sends an additional location request for mobile-3 140 to the location server 110 (step 28b-4b), as long as a time duration allotted to the device discovery request has not yet expired.

If a time duration allotted to the device discovery request has expired, device discovery is terminated, as portrayed in step 28b-9.

Figure 3C:
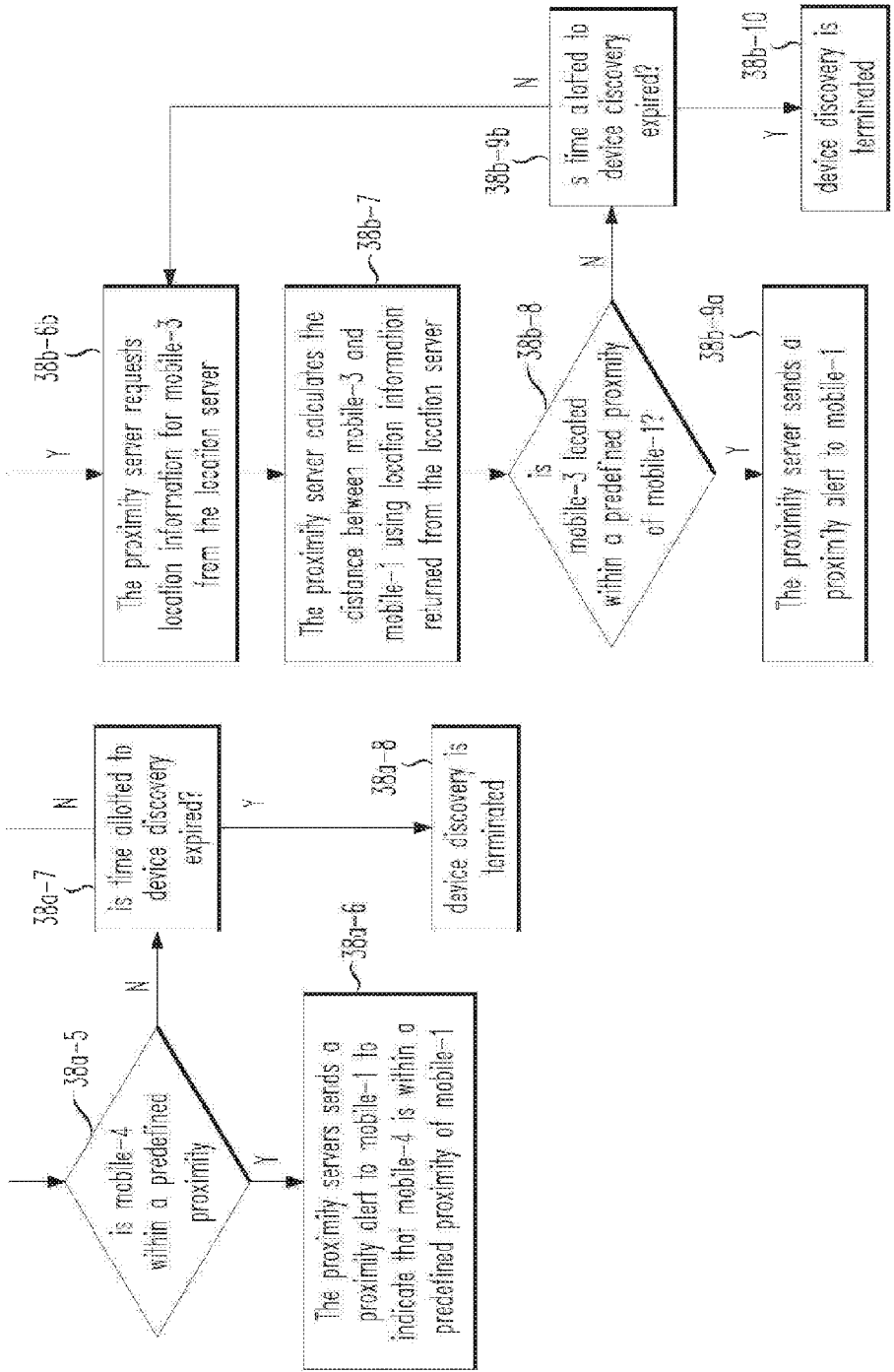

FIGS. 3A-3C depict an exemplary network-centric device discovery solution with area event location service, where the discoverer mobile moves significantly during the device discovery procedure, in accordance with the principles of the present invention.

In particular, as portrayed in step 30 of FIG. 3A, a mobile-1 120, a mobile-2 130, a mobile-3 140, and a mobile-4 150 all subscribe to the same proximity service group.

As shown in step 32, the mobile-1 120, mobile-2 130, mobile-3 140, and mobile-4 150 then move in to the coverage areas of a base station B (BTS-B) 160 and a base station A (BTS-A) 170, respectively, and all are registered by mobile identifier, cell-ID (e.g. cell global identifier (CGI) or E-UTRAN cell global identifier (ECGI)), and other network identifiers (e.g. location area identifier (LAI), routing area identifier (RAI), tracking area identity (TAI), public land mobile network identifier (PLMN-ID)) at a proximity server 100. Mobile-3 140 is serviced by base station A (BTS-A) 170, while mobile-1 120, mobile-2 130, and mobile-4 150 are all serviced by base station B (BTS-B) 160. Mobile-3 140 is not located within the same cell 190 as mobile-1 120, mobile-2 130, and mobile-4 150, but is located within the same zone (e.g. in the same TAI, RAI, LAI) 200 as mobile-1 120, mobile-2 130, and mobile-4 150. Mobile-3 140 is not located within close geographic proximity of mobile-1 120, mobile-2 130, and mobile-4 150.

As shown in step 34, mobile-1 120 sends a device discovery request to the proximity server 100 to request location information for mobile devices (e.g. mobile-2 130, mobile-3 140, and mobile-4 150) subscribed to the same proximity service group as mobile-1 120. Mobile-1 120 preferably forwards the following information with the device discovery request: a proximity services (ProSe) service type, a mobile identifier, a proximity services (ProSe) group ID, current location information, serving network information (e.g. public land mobile network identifier (PLMN-ID), a location area identifier (LAI)/routing area identifier (RAI)/tracking area identity (TAI), cell global identifier (CGI)/E-UTRAN cell global identifier (ECGI), wifi access point address, etc.), etc.

As depicted in step 36, the proximity server 100 receives the device discovery request initiated by mobile-1 120 and searches for proximity based services enabled devices that are both: subscribed to the same proximity service group as mobile-1 120 and camped on the same cell (e.g. ECGI) 190 and/or zone (e.g. location area identity (LAI), routing area identity (RAI), tracking area identity (TAI)) as mobile-1 120.

As shown in steps 38a and 38a-1 of FIG. 3A, if the proximity server 100 finds devices that are both subscribed to the same proximity service group as mobile-1 120 and camped on the same cell 190 as mobile-1 120, the proximity server 100 requests location information for such devices from the location server 110. For instance, in the example portrayed in FIG. 1, the proximity server finds both mobile-2 130 and mobile-4 150 camped on the same cell 190 as mobile-1 120 and thus requests location information for mobile-2 130 and mobile-4 150 from the location server 110.

As shown in step 38a-2 of FIG. 3B, once the proximity server 100 receives location information for mobile-2 130 and mobile-4 150 from the location server 110, the proximity server 100 calculates the distance between mobile-1 120 and mobile-2 130 and mobile-1 120 and mobile-4 150, and finds that mobile-2 130 is currently located with a predefined proximity of mobile-1 120, while mobile-4 150 is not. Using this information, the proximity server 100 transmits a proximity alert message to mobile-1 120 to indicate that mobile-2 130 is currently located within a predefined proximity of mobile-1 120, and thus further communication with mobile-2 is now possible, as portrayed in step 38a-3.

As portrayed in step 38a-4, the proximity server 100 periodically requests location information for mobile-4 150 throughout the duration of time allotted to the device discovery request. If during this time, the proximity server 100 finds that mobile-4 150 has moved within a predefined proximity of mobile-1 120 (step 38a-5), the proximity server 100 sends a proximity alert message to mobile-1 120 to notify mobile-1 120 of this occurrence, as shown in step 38a-6.

Alternatively, as portrayed in step 38a-7 of FIG. 3C, if location information indicates that mobile-4 150 is not located within a predefined proximity of mobile-1 120, the proximity server 100 continues to send periodic location requests to the location server 110 for mobile-4 150, as long as a time duration allotted to the device discovery request is not expired.

If the time duration allotted to the device discovery request has expired, device discovery is terminated, as shown in step 38a-8.

Moreover, if the proximity server 100 finds a device that is both subscribed to the same proximity service group as the discoverer mobile and camped on the same zone as the discoverer mobile, but not camped in the same cell as the discoverer mobile, the proximity server 100 defines an area event for the potential discoveree device.

For instance, in the example depicted in FIG. 1, the proximity server 100 finds that mobile-3 140 is both subscribed to the same proximity service group as mobile-1 120 and located within the same zone 200 as mobile-1 120 (but not located within the same cell 190 as mobile-1 120), as portrayed in step 38*b* of FIG. 3A.

As shown in step 38*b*-1, the proximity server 100 then initiates an area event location request, via the location server 110, to mobile-3 140. The area event location request is preferably defined so that an area event notification is sent to the proximity server 100 each instance mobile-3 140 (i.e. the potential discoveree mobile) enters the area of an E-CGI and/or a WiFi access point where mobile-1 (i.e. the discoverer mobile) 120 attaches. The proximity server 100 preferably allots the same time duration to the area event location request as has been allotted to the device discovery request.

As shown in step 38*b*-2 of FIG. 3B, during the time duration allotted to the device discovery request/area event location request, mobile-1 120 (i.e. the discoverer mobile) moves significantly, e.g. to a different cell or zone.

In step 38*b*-3, the proximity server 100 realizes that mobile-1 120 has moved significantly and cancels the active area event location request(s) initiated in step 38*b*-1. The proximity server 100 then repeats the device discovery process (beginning from step 36 of FIG. 3A).

Steps 38*b*-4 through 38*b*-10 are identical to steps 28*b*-2 through 28*b*-9 of FIGS. 2A-2B.

In particular, as portrayed in step 38*b*-4 of FIG. 3B, once an area event has been initiated for mobile-3 140, the proximity server 100 waits to receive an area event notification from the location server 110.

As shown in steps 38*b*-5 and 38*b*-6*a*, if the proximity server 100 does not receive an area event notification for mobile-3 140 within a time duration allotted to the area event location request, the area event location request is terminated.

Alternatively, as shown in step 38*b*-6*b*, if the proximity server 100 does receive an area event notification for mobile-3 140, indicating that mobile-3 140 has entered the area of an E-CGI and/or a WiFi access point where mobile-1 120 (i.e. the discoverer mobile) attaches, the proximity server 100 sends a location request to the location server 110 to request location information for mobile-3 140.

In step 38*b*-7, the location server 110 returns location information for mobile-3 140 to the proximity server 100 and the proximity server 100 uses the location information to calculate the distance between mobile-1 120 and mobile-3 140. The proximity server 100 then uses the calculated distance to determine whether or not mobile-3 140 is located within a predefined proximity of mobile-1 120.

As shown in steps 38*b*-8 and 38*b*-9*a*, if mobile-3 140 is located within a predefined proximity of mobile-1 120, the proximity server 100 sends a proximity alert message to mobile-1 120 to notify mobile-1 120 that mobile-3 140 is now located within a predefined proximity of mobile-1 120, and thus further communication with mobile-3 is now possible.

Alternatively, as depicted in step 38*b*-9*b*, if mobile-3 140 is not located within a predefined proximity of mobile-1 120, the proximity server 100 sends an additional location request for mobile-3 140 to the location server 110 (step 38*b*-6*b*), as long as a time duration allotted to the device discovery request has not yet expired.

If a time duration allotted to the device discovery request has expired, device discovery is terminated, as portrayed in step 38*b*-10.

In the inventive device discovery procedure using area event location service, if a proximity zone defined for device discovery using area event location service is in the same scale as a serving wireless cell, precise positioning need not be triggered (depending on the geographic size of a predefined proximity zone and a deployed wireless cell (or WiFi access point coverage)).

Detailed procedures illustrated below include a device discovery procedure of a discoverer device, a device discovery procedure of a proximity server, and a device discovery procedure of a discoveree device.

Figure 4:
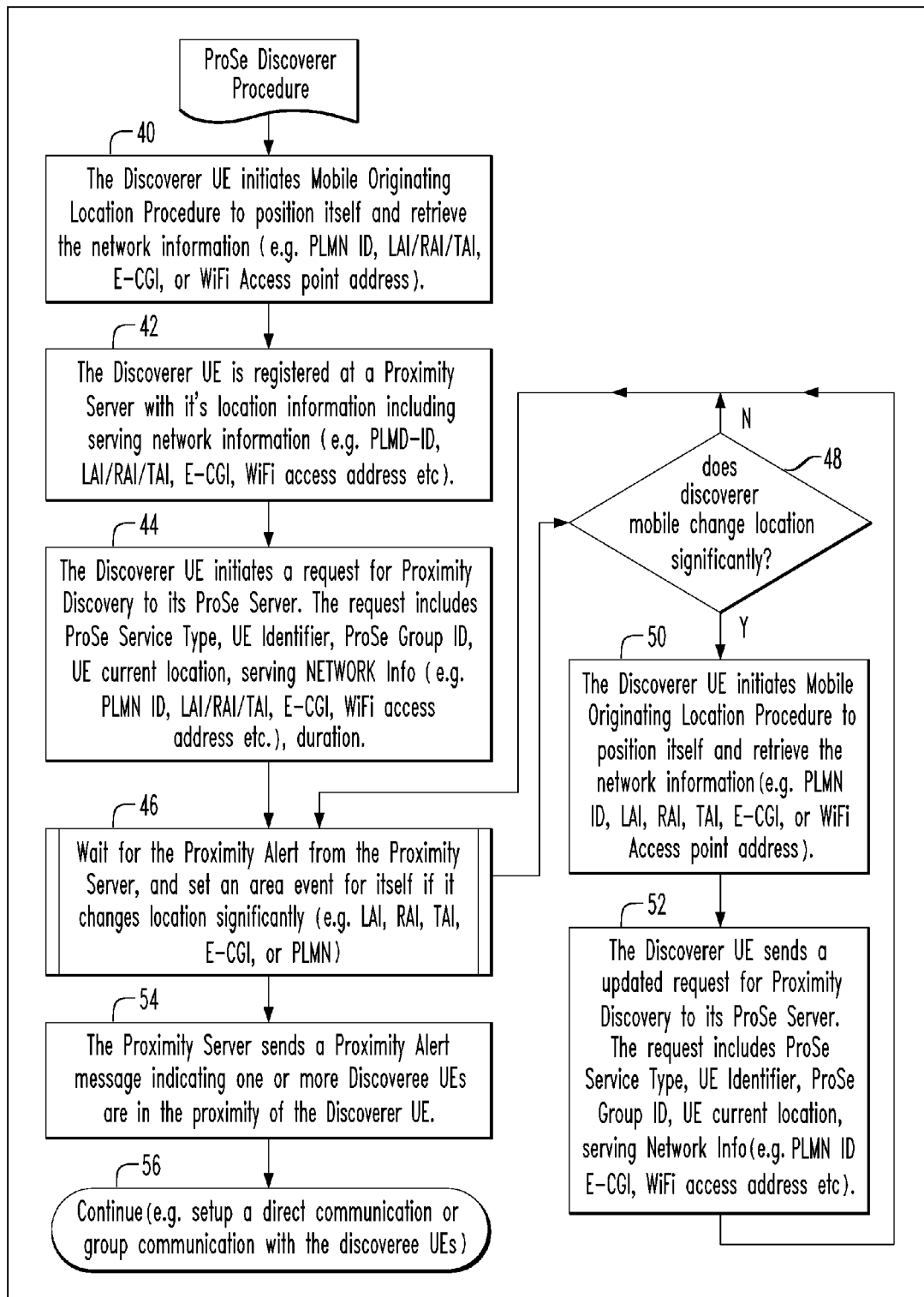
FIG. 4 shows an exemplary device discovery procedure for a discoverer mobile, in accordance with the principles of the present invention.

FIG. 4 shows an exemplary device discovery procedure for a discoverer mobile, in accordance with the principles of the present invention.

In particular, as portrayed in step 40 of FIG. 4, a discoverer mobile initiates a mobile originating location procedure to position itself and retrieve network information (e.g. PLMN-ID, LAI/RAI/TAI, E-CGI or WiFi access point address).

As shown in step 42, the discoverer mobile then uses location information and serving network information (e.g. PLMN-ID, LAI/RAI/TAI, E-CGI or WiFi access point address) retrieved in step 40 to register at a proximity server 100.

In step 44, the discoverer mobile transmits a device discovery request to the proximity server 100 and preferably includes: a proximity services (ProSe) service type, a UE identifier, a ProSe group ID, UE current location, serving network information (e.g. PLMN-ID, LAI/RAI/TAI, E-CGI or WiFi access point address), and a time duration.

As portrayed in step 46, the discoverer mobile then waits to receive a proximity alert message from the proximity server 100.

As shown in steps 48 and 50 of FIG. 4, if the discoverer mobile changes location significantly during the time duration allotted to the device discovery request, the discoverer mobile sets an area event for itself and initiates a mobile originating location procedure to position itself and retrieve network information (e.g. public land mobile network (PLMN)-ID, location area identity (LAI)/routing area identity (RAI)/tracking area identity (TAI), E-UTRAN cell global identity (E-CGI), or WiFi access point address).

As shown in step 52, the discoverer mobile then sends an updated device discovery request to the proximity server 100, comprising a proximity services (ProSe) service type, a UE identifier, a ProSe group ID, UE current location, and serving network information (e.g. PLMN-ID, LAI/RAI/TAI, E-CGI or WiFi access point address), and then continues to wait for a proximity alert message from the proximity server 100 (step 46).

Alternatively, if the discoverer mobile does not change location significantly during the time duration allotted to the device discovery request, the discoverer mobile continues to wait for a proximity alert message from the proximity server 100 (step 46).

In step 54, the discoverer mobile receives a proximity alert message from the proximity server 100, indicating that one or more discoveree mobiles are located within a predefined proximity of the discoverer mobile.

As shown in step 56, the discoverer mobile can now set up a direct communication or group communication with the one or more discoveree mobiles located within a predefined proximity of the discoverer mobile.

FIGS. 5A-5D depict an exemplary device discovery procedure of a proximity server, in accordance with the principles of the present invention.

Figure 5A:
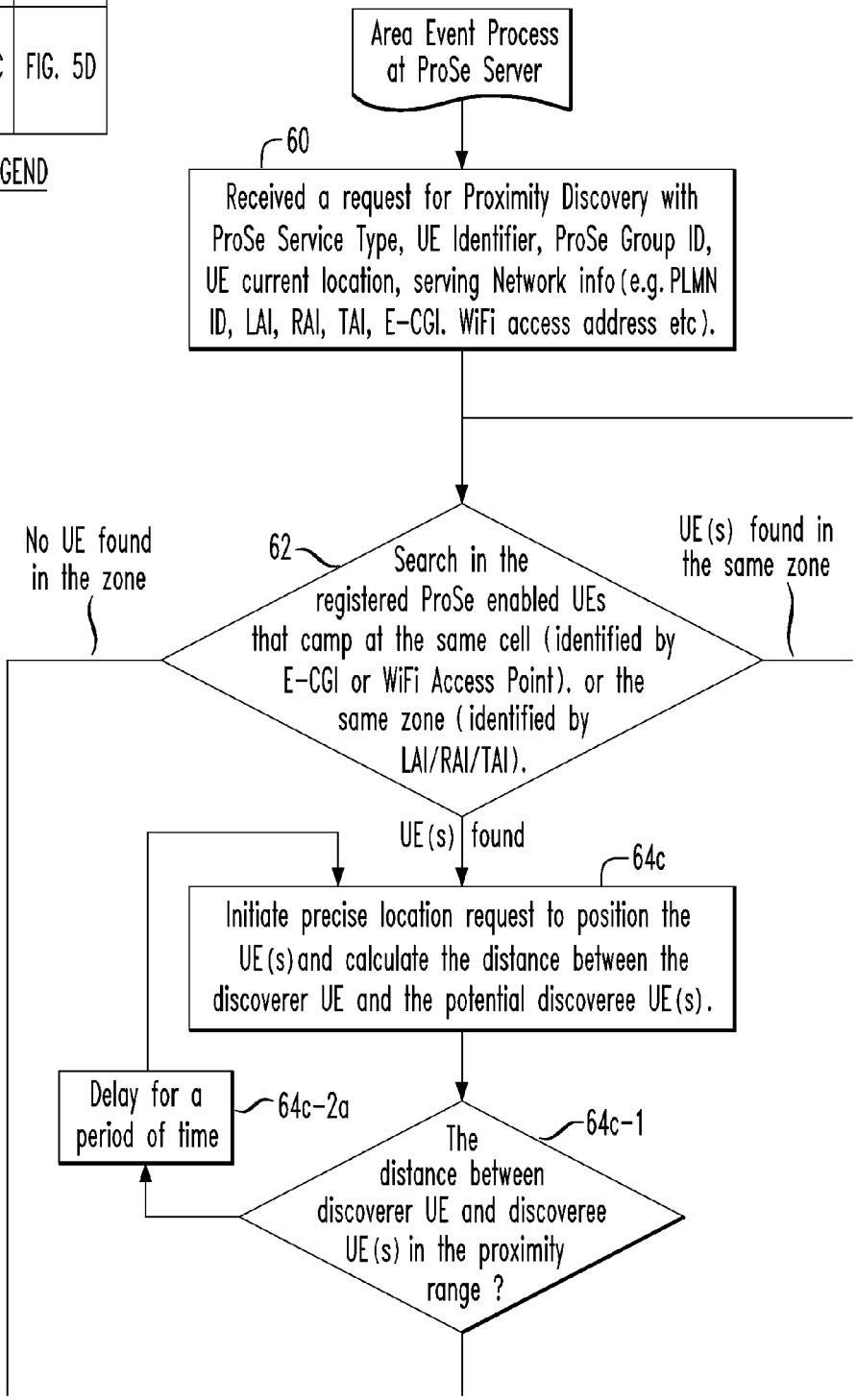
FIGS. 5A-5D depict an exemplary device discovery procedure for a proximity server, in accordance with the principles of the present invention.

As shown in step 60 of FIG. 5A, a proximity server 100 receives a device discovery request, with a proximity services (ProSe) service type, a UE identifier, a proximity services (ProSe) group ID, UE current location information, and serving network information (e.g., PLMN-ID, LAI, RAI, TAI, E-CGI, WiFI access address, etc.), from a discoverer mobile.

As portrayed in step 62, the proximity server 100 searches for proximity based services enabled devices that are both subscribed to the same proximity service group as the discoverer mobile, and camped on the same cell (e.g. E-CGI or WiFi access point) and/or zone (e.g. LAI, RAI, TAI) as the discoverer mobile.

If the proximity server 100 is unable to find any devices camping on the same cell and/or zone as the discoverer mobile, the proximity server 100 returns a result of 'no UE found' to the discoverer mobile in response to the device discovery request, as portrayed in step 64a.

Figure 5B:
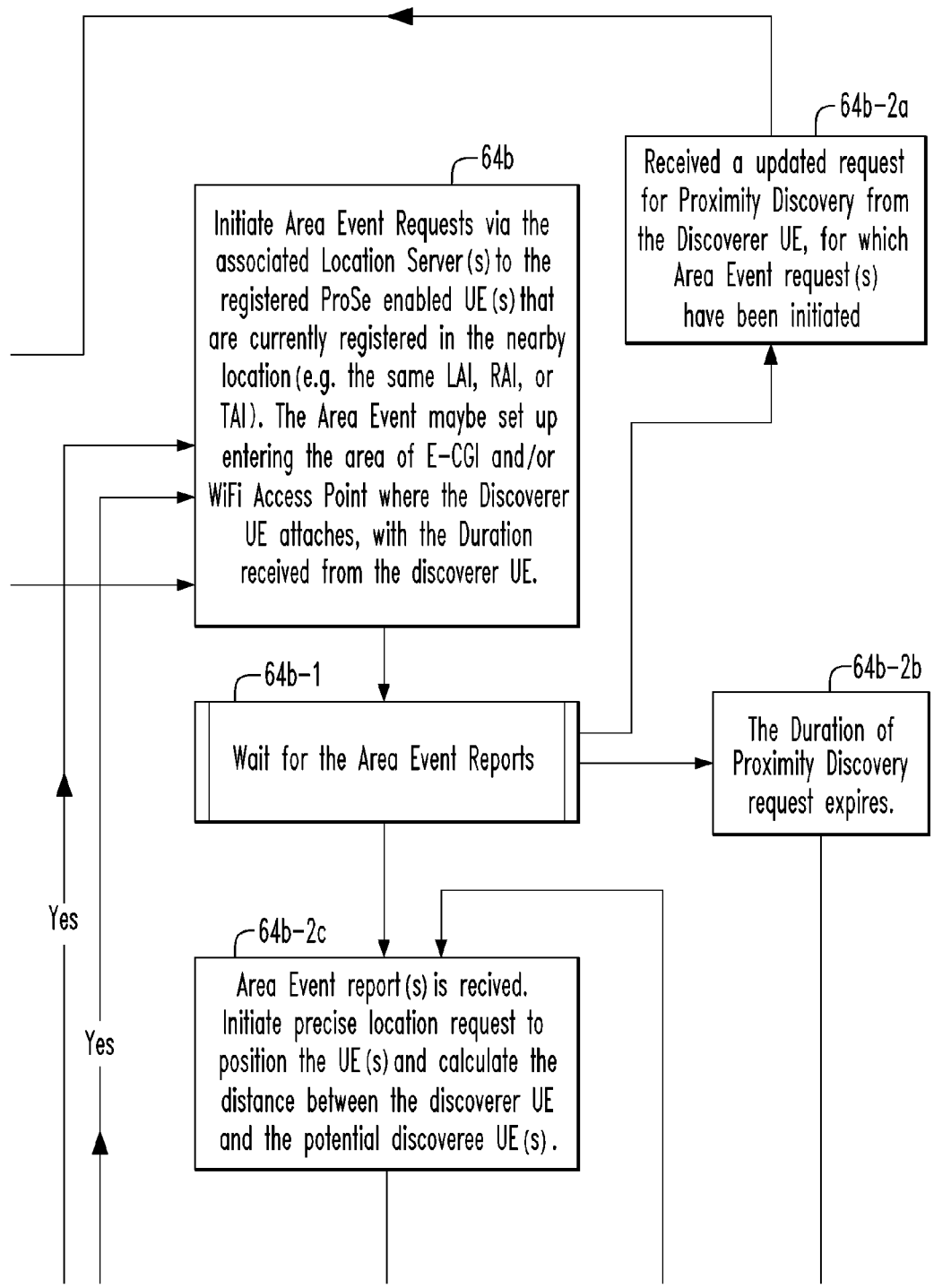

Rather, if the proximity server 100 identifies a mobile device camped in the same zone (e.g. LAI, RAI, TAI) as the discoverer mobile, but not camped in the same cell as the discoverer mobile, the proximity server 100 defines an area event, via one or more associated location servers 110, for the identified proximity services enabled device, as portrayed in step 64b of FIG. 5B. The area event is preferably defined so that an area event notification is sent to the proximity server 100 each time the identified proximity services enabled device enters the area of an E-CGI and/or a WiFI access point where the discoverer mobile attaches. The proximity server 100 preferably allots the same time duration to the area event location request as has been allotted to the device discovery request.

As shown in step 64b-1, the proximity server 100 subsequently waits to receive an area event notification from the location server 110.

As portrayed in step 64b-2a, if the proximity server 100 receives an updated request for device discovery from the discoverer mobile, indicating that the discoverer mobile has moved significantly since the receipt of the first device discovery request, the proximity server 100 repeats step 62 of FIG. 5A, i.e., searches for proximity based services enabled devices that are both subscribed to the same proximity service group as the discoverer mobile and camped on the same cell (e.g. E-CGI or WiFi access point) and/or zone (e.g. LAI, RAI, TAI) as the discoverer mobile.

As portrayed in step 64b-2b, if the time duration allotted to the area event location request expires before the proximity server 100 receives any area event notifications from the location server 110, the proximity server 100 terminates the area event location request (step 66).

Alternatively, as portrayed in step 64b-2c, if the proximity server 100 does receive an area event notification during the time duration allotted to the area event location request, indicating that the mobile device identified in step 64b has moved into an area of an E-CGI and/or a WiFI access point where the discoverer mobile attaches, the proximity server 100 sends a precise location request to the location server 110 to position the mobile device for which the area event notification has been received. The proximity server 100 then calculates the distance between the discoverer mobile and the potential discoveree mobile (i.e. the device that is potentially located within a predefined proximity of the discoverer mobile).

As shown in step 64b-3, the proximity server 100 subsequently determines whether the distance calculated between the discoverer mobile and the potential discoveree mobile indicates that the potential discoveree mobile is located within a predefined proximity of the discoverer mobile.

As shown in step 64b-4a, if the proximity server 100 determines that the potential discoveree mobile is not located within a predefined proximity of the discoverer mobile, the proximity server 100 delays for a period of time, and then repeats step 64b-2c of FIG. 5B, i.e., sends another precise location request to the location server 110 to position the mobile device for which the area event notification has been received and calculates the distance between the discoverer mobile and the potential discoveree mobile.

Alternatively, as shown in step 64b-4b, if the proximity server 100 determines that the potential discoveree mobile is located within a predefined proximity of the discoverer mobile, the proximity server 100 sends a proximity alert message to the discoverer mobile to notify the discoverer mobile that a device is located within a predefined proximity of the discoverer mobile, and thus further communication is now possible.

The proximity server then continues to process the device discovery request, e.g., the proximity server 100 may setup a direct communication or a group communication with the discoveree mobile.

As shown in step 64b-5, throughout the remaining time duration allotted to the device discovery request, the proximity server 100 continues to search for any additional devices located nearby the discoverer mobile.

Figure 5C:
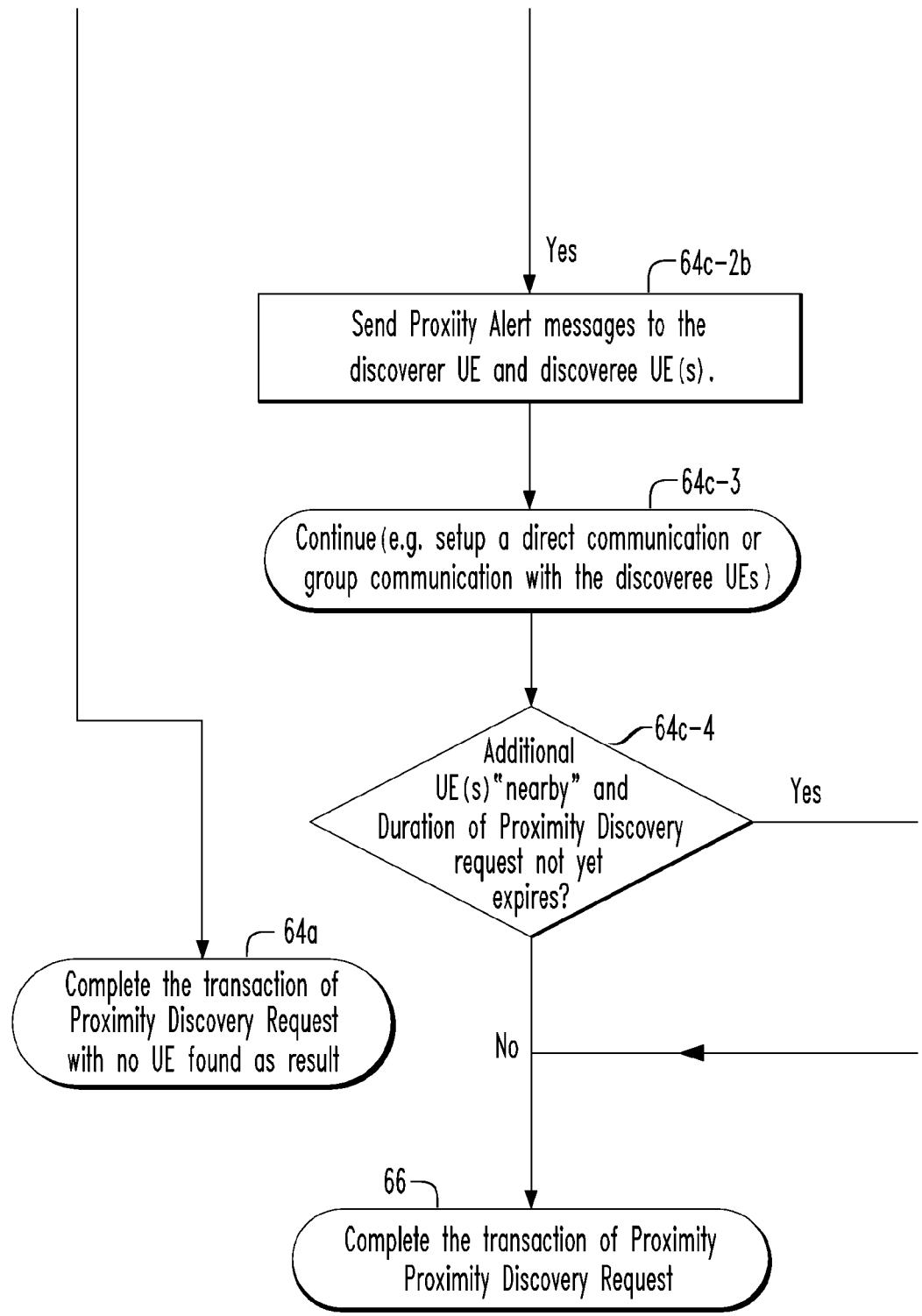
Figure 5D:
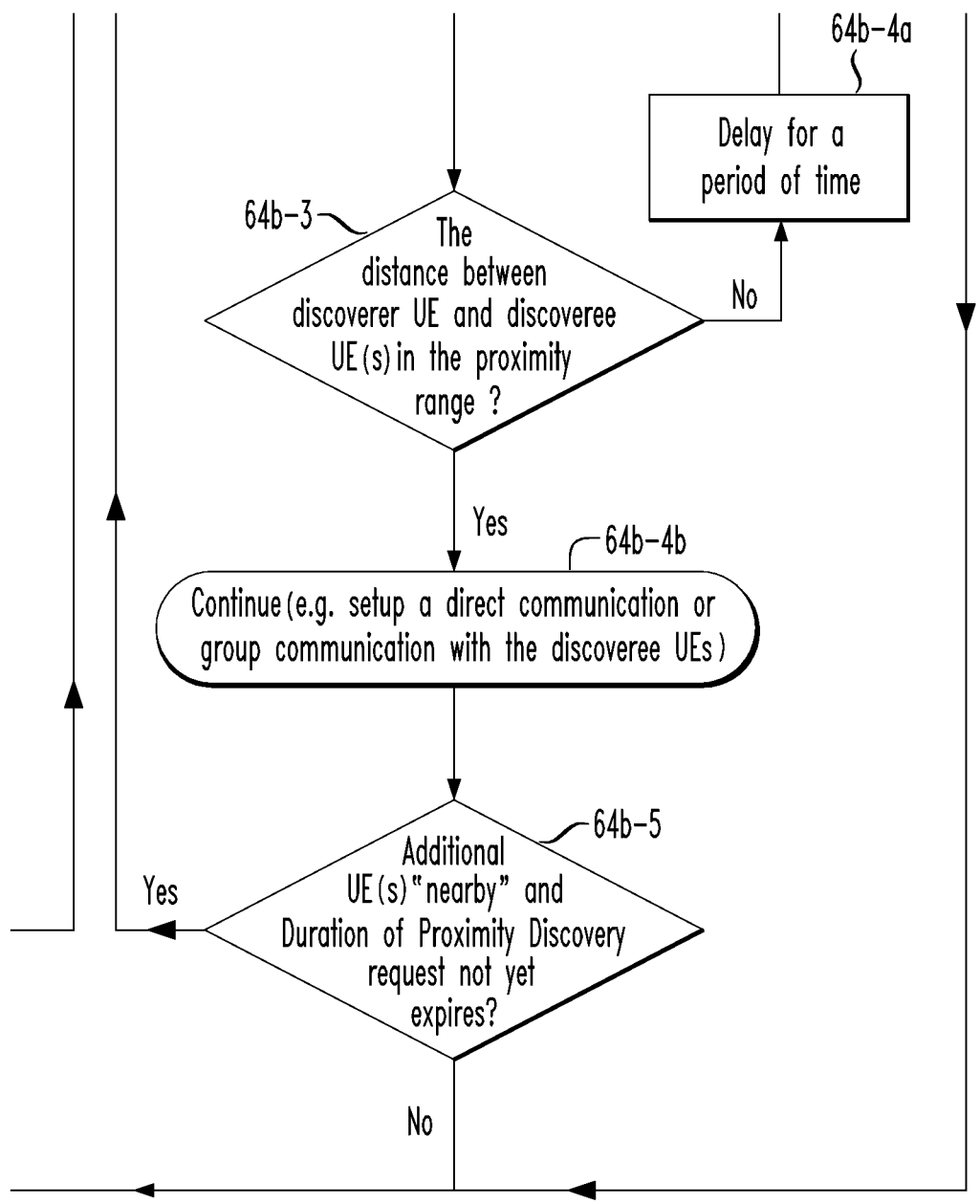

If, during the remaining time duration allotted to the device discovery request, the proximity server 100 finds that another mobile device has moved nearby the discoverer mobile, the proximity server 100 repeats steps 64b through 64b-5 of FIGS. 5B-5D.

Rather, if the proximity server 100 does not identify any additional mobile devices located nearby the discoverer mobile throughout the remaining time allotted to the device discovery request, the proximity server 100 terminates the device discovery request (step 66).

Moreover, as portrayed in step 64c of FIG. 5A, if in step 62, the proximity server 100 identifies a mobile device camped in the same cell as the discoverer mobile, the proximity server 100 sends a precise location request to the location server 110 to request positioning information for the discovered device. The proximity server 100 then calculates the distance between the discoverer mobile and potential discoveree mobile (i.e. the device potentially located within a predefined proximity of the discoverer mobile).

In step 64c-1, the proximity server 100 uses the distance calculated in step 64c to determine whether or not the potential discoveree mobile is located within a predefined proximity of the discoverer mobile.

As shown in step 64c-2a, if the proximity server 100 determines that the potential discoveree mobile is not located within a predefined proximity of the discoverer mobile, the proximity server 100 delays for a period of time, and then repeats step 64c, i.e., sends another precise location request to the location server 110 to position the mobile device camped in the same cell as the discoverer mobile, and calculates the distance between the discoverer mobile and the potential discoveree mobile using the location information.

Alternatively, as shown in step 64c-2b, if the proximity server 100 determines that the potential discoveree mobile is located within a predefined proximity of the discoverer mobile, the proximity server 100 sends a proximity alert message to the discoverer mobile to notify the discoverer mobile that a device is located within a predefined proximity of the discoverer mobile and thus further communication with this device is now possible. The proximity server 100 then continues to process the device discovery request, e.g., the proximity server 100 may setup a direct communication or a group communication with the discoveree mobile, as depicted in step 64c-3.

As shown in step 64c-4, throughout the remaining time duration allotted to the device discovery request, the proximity server 100 continues to search for any additional devices located nearby the discoverer mobile.

If, during the time duration allotted to the device discovery request, the proximity server 100 finds that an additional mobile device has moved nearby the discoverer mobile, the proximity server 100 performs steps 64b through 64b-5 of FIGS. 5B-5D.

Rather, if the proximity server 100 does not identify any additional mobile devices located nearby the discoverer mobile throughout the remainder of time allotted to the device discovery request, the proximity server 100 terminates the device discovery request (step 66).

Figure 6:
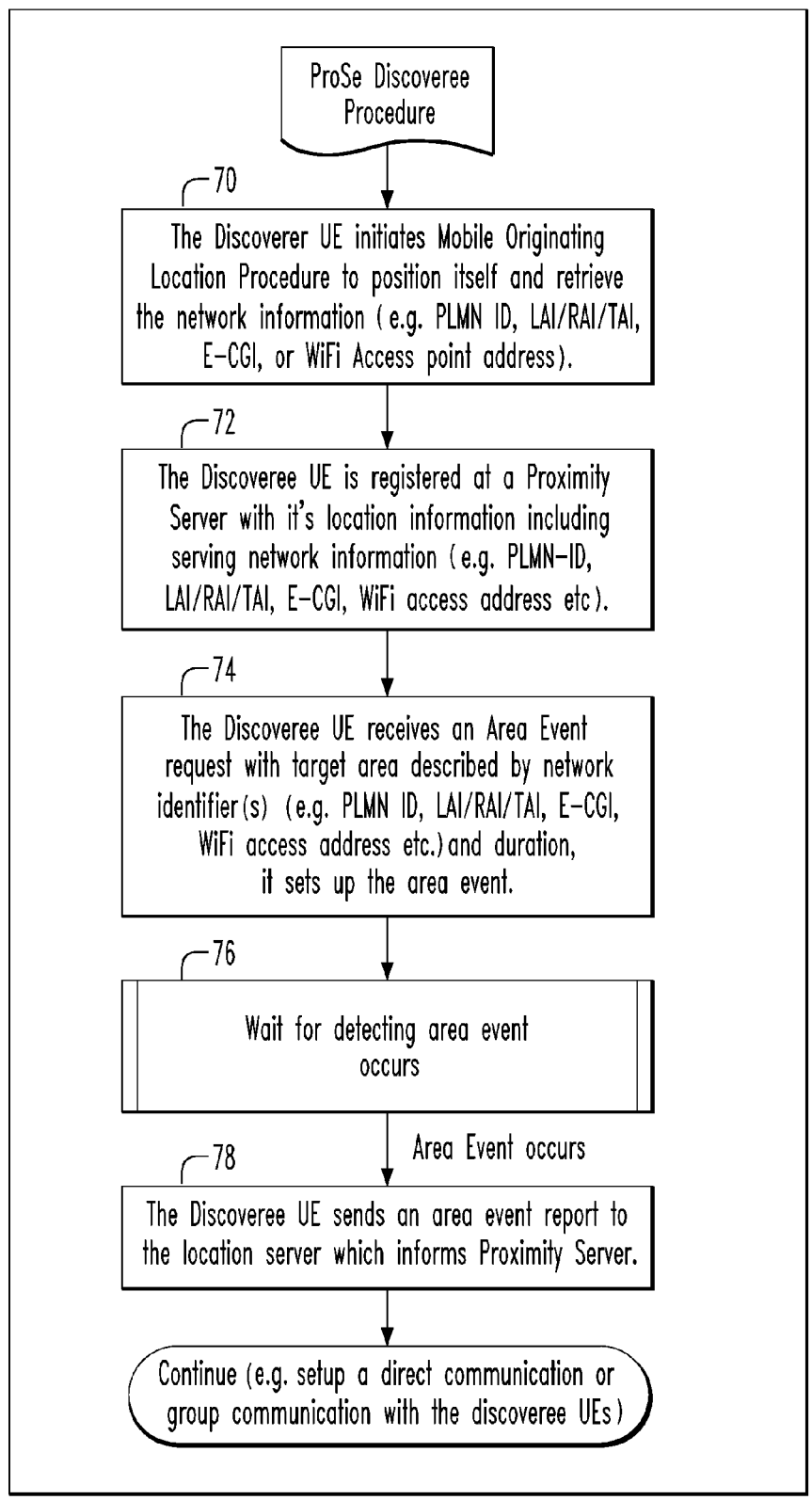
FIG. 6 shows an exemplary device discovery procedure for a discoveree mobile, in accordance with the principles of the present invention.

FIG. 6 shows an exemplary device discovery procedure for a discoveree mobile, in accordance with the principles of the present invention.

In particular, as portrayed in step 70 of FIG. 6, a discoveree mobile initiates a mobile originating location procedure to position itself and obtain network information (e.g. PLMN-ID, LAI/RAI/TAI, E-CGI or WiFi access point address).

As shown in step 72, the discoveree mobile then uses location information and serving network information (e.g. PLMN-ID, LAI/RAI/TAI, E-CGI or WiFi access point address) retrieved in step 70 to register at a proximity server 100.

In step 74, the discoveree mobile receives an area event location request from a location server 110, identifying a target area (e.g. an area of an E-CGI and/or WiFi access point where the discoverer mobile attaches) described by network identifiers (e.g. a PLMN-ID, a LAI/RAI/TAI, a E-CGI, and a WiFi access address, etc.), and a time duration. The discoveree mobile uses the area event location request to set up an area event.

As portrayed in step 76, the discoveree mobile waits for a detecting area event to occur.

In step 78, the area event occurs (e.g. the discoverer mobile moves into the area of an E-CGI and/or WiFi access point where a discoverer mobile attaches) and the discoveree mobile sends an area event report to the location server 110. The area event report is used to inform the proximity server 100 that the area event has occurred.

As shown in step 80, the discoveree mobile can now set up a direct communication or a group communication with other discoveree mobiles.

While the invention has been described with reference to the exemplary embodiments thereof, those skilled in the art will be able to make various modifications to the described embodiments of the invention without departing from the true spirit and scope of the invention.

What is claimed is:

1. A network-centric method of providing proximity services to mobile devices, comprising:
   receiving a request for a device discovery for a discoverer wireless device;
   identifying another wireless device based on the request located within a same zone as the discoverer wireless device and in another geographical area of a cell global identity (CGI) than the discoverer wireless device, wherein the other wireless device is subscribed to a same proximity service group as the discoverer wireless device;
   monitoring for an area event notification from a location server in response to identifying that the other wireless device is located in the other geographical area of the CGI than the discoverer wireless device, wherein the area event notification indicates that the other wireless device has moved into a same geographical area as the discoverer wireless device;
   requesting location information from the location server for the other wireless in response to an indication that an area event has occurred; and
   determining whether the other wireless device is within a predefined proximity of the discoverer wireless device based on the received location information.

2. The network-centric method of providing proximity services to mobile devices according to claim 1, wherein:
   the request for device discovery is received from the discoverer wireless device.

3. The network-centric method of providing proximity services to mobile devices according to claim 1, wherein:
   the CGI is an Evolved Universal Terrestrial Access Network (E-UTRAN) cell global identity (E-CGI).

4. The network-centric method of providing proximity services to mobile devices according to claim 1, further comprising:
   canceling the area event, and repeating device discovery, when the discoverer wireless device moves significantly during a time duration allotted to the request for the device discovery.

5. The network-centric method of providing proximity services to mobile devices according to claim 1, further comprising:
   canceling the area event, and repeating device discovery, when the discoverer wireless device moves to a different zone during a time duration allotted to the request for the device discovery.

6. The network-centric method of providing proximity services to mobile devices according to claim 1, wherein:
   the zone is a location area identity (LAI).

7. The network-centric method of providing proximity services to mobile devices according to claim 1, wherein:
   the zone is a tracking area identity (TAI).

8. The network-centric method of providing proximity services to mobile devices according to claim 1, wherein:
   the zone is a routing area identity (RAI).

9. A network-centric method of providing proximity services to mobile devices, comprising:
   receiving a request for a device discovery for a discoverer wireless device;
   identifying another wireless device based on the request located within a same zone as the discoverer wireless device and in another geographical area of a wireless local area network (WLAN) than the discoverer wireless device, wherein the other wireless device is subscribed to a same proximity service group as the discoverer wireless device;
   monitoring for an area event notification from a location server in response to identifying that the other wireless device is located in the other geographical area of the WLAN than the discoverer wireless device, wherein the area event notification indicates that the other wireless device has moved into a same geographical area as the discoverer wireless device;
   requesting location information from the location server for the other wireless in response to an indication that an area event has occurred; and
   determining whether the other wireless device is within a predefined proximity of the discoverer wireless device based on the received location information.

10. The network-centric method of providing proximity services to mobile devices according to claim 9, wherein:
the request for device discovery is received from the discoverer wireless device.

11. The network-centric method of providing proximity services to mobile devices according to claim 9, further comprising:
canceling the area event, and repeating device discovery, when the discoverer wireless device moves significantly during a time duration allotted to the request for the device discovery.

12. The network-centric method of providing proximity services to mobile devices according to claim 9, further comprising:
canceling the area event, and repeating device discovery, when the discoverer wireless device moves to a different zone during a time duration allotted to the request for the device discovery.

13. The network-centric method of providing proximity services to mobile devices according to claim 9, wherein:
the zone is a location area identity (LAI).

14. The network-centric method of providing proximity services to mobile devices according to claim 9, wherein:
the zone is a tracking area identity (TAI).

15. The network-centric method of providing proximity services to mobile devices according to claim 9, wherein:
the zone is a routing area identity (RAI).

16. A method, the method comprising:
identifying in response to a request for a device discovery for a discoverer wireless device another wireless device located within a same zone as the discoverer wireless device and in another geographical area of a cell global identity (CGI) than the discoverer wireless device, wherein the other wireless device is subscribed to a same proximity service group as the discoverer wireless device;
receiving an area event notification from a location server, wherein the area event notification indicates that the other wireless device has moved into a same geographical area as the discoverer wireless device;
requesting location information from the location server for the other wireless in response to receiving the area event notification; and
determining whether the other wireless device is within a predefined proximity of the discoverer wireless device based on the received location information.

* * * * *